United States Patent
Agtual

(10) Patent No.: US 10,357,021 B1
(45) Date of Patent: Jul. 23, 2019

(54) PET GROOMING TOOL

(71) Applicant: Chona Agtual, Vail, AZ (US)

(72) Inventor: Chona Agtual, Vail, AZ (US)

(*) Notice: Subject to any disclaimer, the term of this patent is extended or adjusted under 35 U.S.C. 154(b) by 0 days.

(21) Appl. No.: 16/139,067

(22) Filed: Sep. 23, 2018

Related U.S. Application Data

(63) Continuation of application No. 29/658,164, filed on Jul. 29, 2018, now Pat. No. Des. 844,261.

(60) Provisional application No. 62/674,735, filed on May 22, 2018.

(51) Int. Cl.
*A01K 13/00* (2006.01)
*A46B 5/02* (2006.01)
*A46B 9/00* (2006.01)
*A46B 3/08* (2006.01)
*A46B 9/02* (2006.01)

(52) U.S. Cl.
CPC ............... *A01K 13/00* (2013.01); *A46B 3/08* (2013.01); *A46B 5/02* (2013.01); *A46B 9/005* (2013.01); *A46B 9/028* (2013.01); *A46B 2200/1093* (2013.01)

(58) Field of Classification Search
CPC ........ A01K 13/00; A01K 13/002; A46B 3/00; A46B 9/005; A46B 9/028; A46B 2200/10; A46B 2200/1086; A46B 2200/1093; A46B 15/0055; A46B 15/0059; A46B 15/0065; A46B 15/0079
USPC ......................................... 119/626, 632, 633
See application file for complete search history.

(56) References Cited

U.S. PATENT DOCUMENTS

| | | | |
|---|---|---|---|
| 3,491,725 A * | 1/1970 | Maniscalco | A01K 13/002 119/625 |
| D619,309 S | 7/2010 | Vandervoet | |
| 7,748,350 B2 | 7/2010 | Vandervoet | |
| 8,720,381 B2 | 5/2014 | Wang | |
| D739,986 S | 9/2015 | Sullivan et al. | |
| 9,301,499 B2 * | 4/2016 | Holt, Jr. | A01K 13/002 |
| D779,135 S | 2/2017 | Chang | |
| 9,807,978 B2 * | 11/2017 | Longoria | A01K 13/002 |
| 10,028,485 B2 * | 7/2018 | Cafasso | A45D 24/10 |
| D843,668 S * | 3/2019 | Cafasso | A01K 13/002 D30/159 |

(Continued)

FOREIGN PATENT DOCUMENTS

DE 10310167 A1 * 9/2004 ........... A01K 13/002

OTHER PUBLICATIONS

SureGrip Extra Fine/Medium Double Siding Stripping Rake; http://www.groomerschoice.com/SureGrip-Fine_Coarse-Double-Sided-Stripping-Rake/productinfo/TL400/.

(Continued)

*Primary Examiner* — David J Parsley
*Assistant Examiner* — Danielle A Clerkley
(74) *Attorney, Agent, or Firm* — Rashauna Norment

(57) ABSTRACT

A pet grooming tool has a handle, a support member, and a grooming mechanism for de-shedding and grooming coarse, long, thick fur and fine, short fur or the undercoat of an animal during the grooming process while using a single tool. The grooming mechanism has a rod, a plurality of spacers, a plurality of single-sided combs, and a plurality of double-sided combs, with each of the combs having a cutting edge. The spacers and combs are arranged such that this single tool can be utilized for different animals having varying lengths and thicknesses. This tool minimizes the need for expert technique and experience in grooming an animal.

18 Claims, 9 Drawing Sheets

(56) References Cited

U.S. PATENT DOCUMENTS

2012/0304938 A1* 12/2012 Wang .................. A01K 13/002
                                                    119/618
2017/0071156 A1*  3/2017 Cafasso ............... A01K 13/002

OTHER PUBLICATIONS

Chona's Shears; https://chonashears.net/product/rake-undercoat-4-count/.
What Is the Difference Between Rakes and Undercoat Rakes?; https://www.learn2groomdogs.com/what-is-the-difference-between-rakes-and-undercoat-rakes/.

* cited by examiner

PET GROOMING TOOL

CROSS-REFERENCE TO RELATED APPLICATIONS

This application claims the benefit of and priority to currently U.S. Provisional Application No. 62/674,735, filed May 22, 2018, and the provisional application is incorporated herein by reference; this application is a continuation of and claims priority to currently U.S. Design patent application Ser. No. 29/658,164, filed Jul. 29, 2018, and the design patent application is incorporated herein by reference.

FEDERALLY SPONSORED RESEARCH AND DEVELOPMENT

Not applicable.

BACKGROUND OF THE INVENTION

1. Field of the Invention

The present invention is a pet grooming tool having an arrangement of a plurality of single-sided combs, a plurality of double-sided combs, a rod, and a plurality of spacers, with each side of the combs having a cutting edge, wherein the combs and spacers are positioned and arranged along the rod and secured with fasteners. One side of the combs is adapted to dematting coarse animal hair or fur, and the opposite side of the combs is adapted for general upkeep of fine, short animal hair or fur.

2. Description of Arguably Related Art Including Information Disclosed for 37 CFR 1.97 and 1.98

Regular grooming is essential for an animal's appearance and health. These grooming activities include de-shedding and removing undercoat, and thinning thick coats of fur. Dogs are examples of animals that have a top coat and an undercoat of fur. For some dogs, the undercoat is a thick, dense coat of short fur hairs that can be challenging to de-shed and to groom.

Some pet grooming tools are ineffective, inefficient, and cumbersome for grooming pet hair and for removing shed hair. Some pet grooming tools have cutting edges, blades, or teeth located on the inside portion of the grooming comb, but the design is usually not effective because the location and structure of the blade and comb can hurt or scratch the animal's skin. Other grooming combs or tools have blades or blade arrangements that are too fine and cannot be used for animals with thick or dense hair. Thus, these tools are not versatile for use with different animals with fine hair or with dense hair so multiple tools must be used for different animals.

Generally, in the grooming industry, "rake" tools are used to easily remove dead, shed fur without removing the existing fur coat. Generally, in the industry, "undercoat rake" tools have curved blades that are used to cut or remove the top coat of fur as well as the undercoat of fur. Successfully removing the desired shed hair, fine hair, coarse hair, and/or undercoat without scratching or injuring the animal requires experience, proper techniques, and proper tools.

Vandervoet (U.S. Pat. No. 7,748,350) discloses an apparatus for grooming an animal's fur. The apparatus has a blade assembly and a handle assembly. The blade assembly has a first and second array of edged parallel metal blades. For the first array of parallel single edged metal blades, each blade has rounded ends with a sharpened interior curve. For the second array of parallel double-edge blades, each of the double edge blades has a sharpened interior curve. Vandervoet noted that blade assembly heads with tightly spaced blades had tip lengths that prohibited the cutting plates from adequately cutting fine, short undercoats, or for cutting fine larger coats. The double-sided combs and the single-sided combs are separated by a single spacer and are arranged double-sided comb, single spacer, single-sided comb, single spacer, double-sided comb (repeat sequence). The blade assembly is supported on a pin or rod inserted through a hole in each blade comb, with the pin secured at each end with fasteners on or with a pair of metal support arms. The blade assembly is taught to have the following configuration:

Fastener—1 SP|DSC|1 SP|1 SSC|1 DSC|1 SP|1 SSC|1 SP|1 DSC . . . |1 SP|1 SSC|1 SP|1 DSC|1 SP—fastener. Where DSC=double-sided comb/blade; SP=spacer/washer; SSC=single-sided comb/blade " . . . "=repeated sequence Wang (U.S. Published Patent Application No. 2012/0304938) discloses in FIGS. 1 and 2, a deshedding grooming tool having a plurality of single-sided blade combs, a handle, and a pair of bracket arms. Each comb is separated by a single washer/spacer, with each comb and spacer each supported on a rod. Only a single spacer is positioned between the last comb and the bracket arm.

The Inventor's earlier model of a grooming tool discloses a pet grooming tool having a handle, a support member, and a grooming mechanism. The grooming mechanism (or a blade assembly) has a plurality of single-sided combs each with a cutting edge, a plurality of double-sided combs each with a cutting edge, a plurality of spacers, a set of fasteners, and a rod. The support member has a bracket or brace having two opposing, upstanding arms that support all the combs and spacers positioned on the rod. Here, each comb is separated by a single spacer. The arrangement of the combs and spacers were:

Fastener—1 SP|1 DSC|1 SP|1 SSC|1 SP|1 DSC|1 SP|1 SSC| . . . 1 SP|1 SSC|1 SP|1 DSC|1 SP—Fastener.

A further need for improvement arose from the combs still binding on an animal's coat during grooming. The arrangement of the comb-single spacer-comb, along with the size of the combs and spacers needed re-imagining.

A need exists for a pet grooming tool that solves these problems while utilizing a single tool.

There is a need for a pet grooming tool, namely a pet grooming comb, that has a plurality of single-sided combs each having a cutting edge, a plurality of double-sided combs each having a cutting edge, and a plurality of spacers, with the combs and spacers being positioned along a rod in a double-sided comb-two spacers-single-sided comb-two spacers-single-sided comb-two spacers-double-sided comb configuration, with the double-sided combs adapted for grooming and de-shedding long fur and the single-sided combs adapted for cutting both short haired animals.

There is a need for a pet grooming tool that is configured to easily and quickly groom animals having varying fur lengths and thicknesses.

None of the listed patent references disclose, teach, or suggest a pet grooming tool having the selection and arrangement of the claimed features of the invention, namely, the configuration, arrangement, spacing, and number of a plurality of spacers, a plurality of single-sided combs, and a plurality of double-sided combs with each of the combs having a cutting edge, with at least two spacers abutting between each comb, with this single grooming tool being selectively used to de-shed and/or groom fine animal hair or fur and coarse, long animal hair or fur.

SUMMARY OF THE INVENTION

In general, an embodiment of the invention is a pet grooming tool comprising (including or having) a handle, a support member, and a grooming mechanism, with the support member having a base, a pair of arms each having a lateral slot, and with the grooming mechanism having a rod removably positioned transverse to the arms within the arm slots, a plurality of spacers, a plurality of single-sided combs with each comb having a cutting edge, a plurality of double-sided combs with each side of the combs having a cutting edge, and at least one fastener. The plurality of single-sided combs and the plurality of double-sided combs are arranged and spaced along the length of the rod in a particular arrangement, with each comb being separated by two spacers so the combs can be used to selectively de-shed or groom fine fur or hair and coarse fur or hair while using a single tool for different animals having varying fur lengths and thicknesses. The rod is supported at each end within the arm slots. The arms are affixed in an upright position from the base, with the base being supported by the handle. Each of the combs has a defined shape, an inset distance and angle of the blade or cutting edge, and a curvature of the comb's proximal end to prevent injuring the animal.

It is an object of this invention to provide a pet grooming tool that has an arrangement of a plurality of single-sided combs, a plurality of double-sided combs, and a plurality of spacers, wherein the tool is adapted to groom and de-shed long fur, short fur, coarse fur, and fine fur.

It is another object of the invention to cut tangles or mats of pet fur or hair during a grooming operation.

BRIEF DESCRIPTION OF THE SEVERAL VIEWS OF THE DRAWING

The invention may be more readily described by reference to the accompanying drawing figures and the following description of the drawing figures. In the drawing.

Figure 1:
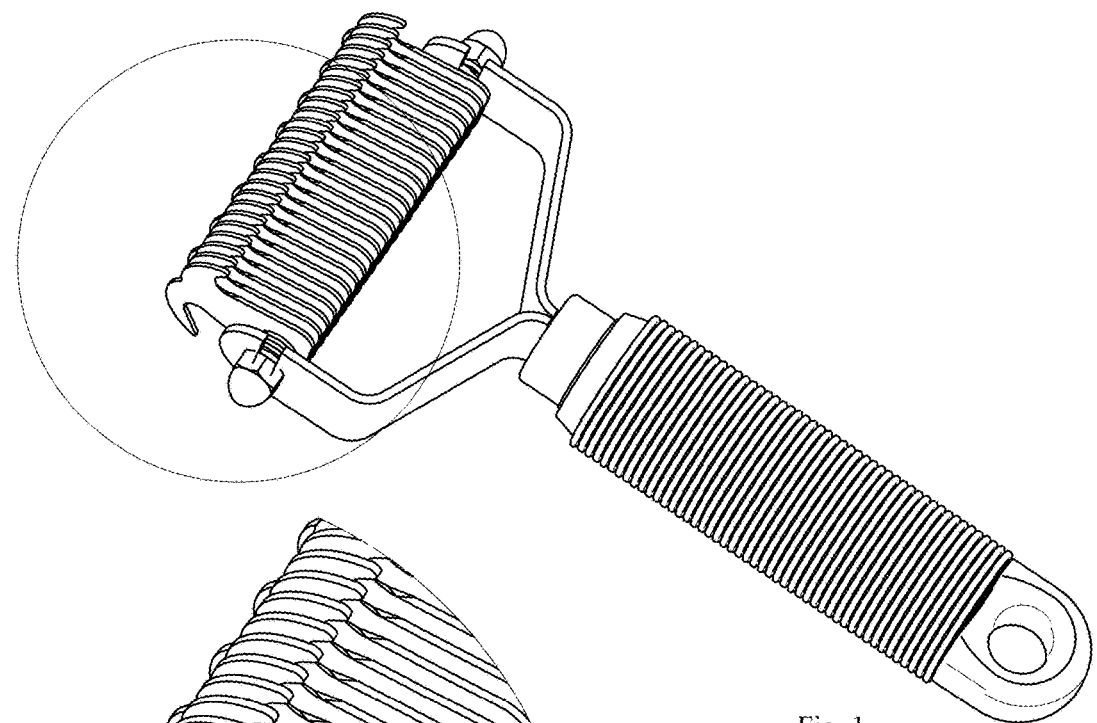
FIG. 1 is a perspective view of my pet grooming tool, showing my new design.
Figure 2:
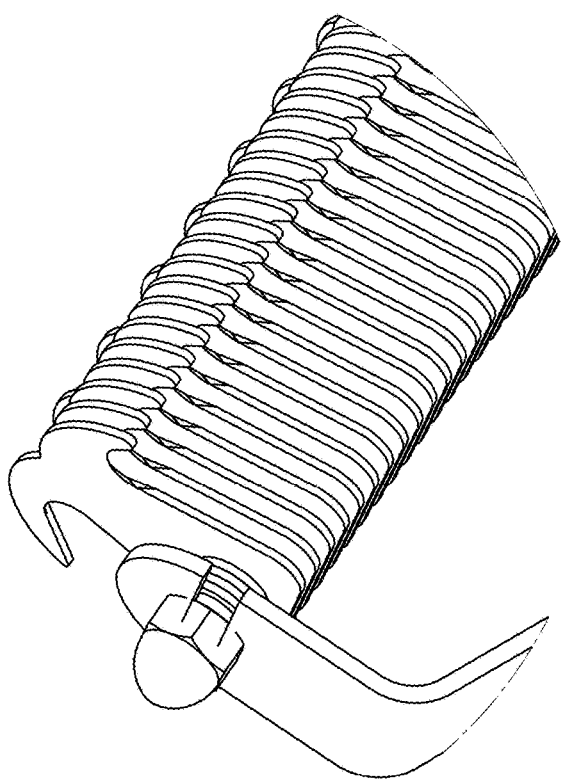
FIG. 2 is an exploded view of FIG. 1 thereof.
Figure 3:
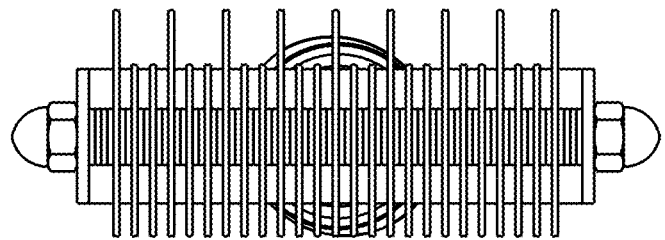
FIG. 3 is a top plan view of FIG. 1 thereof.
Figure 4:
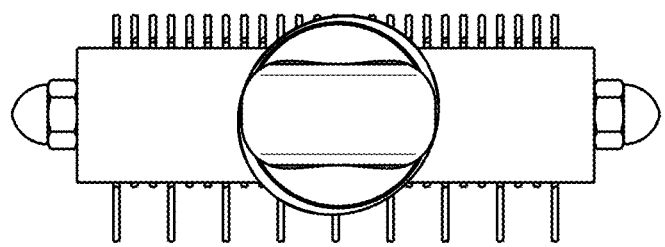
FIG. 4 is a bottom plan view of FIG. 1 thereof.
Figure 5:
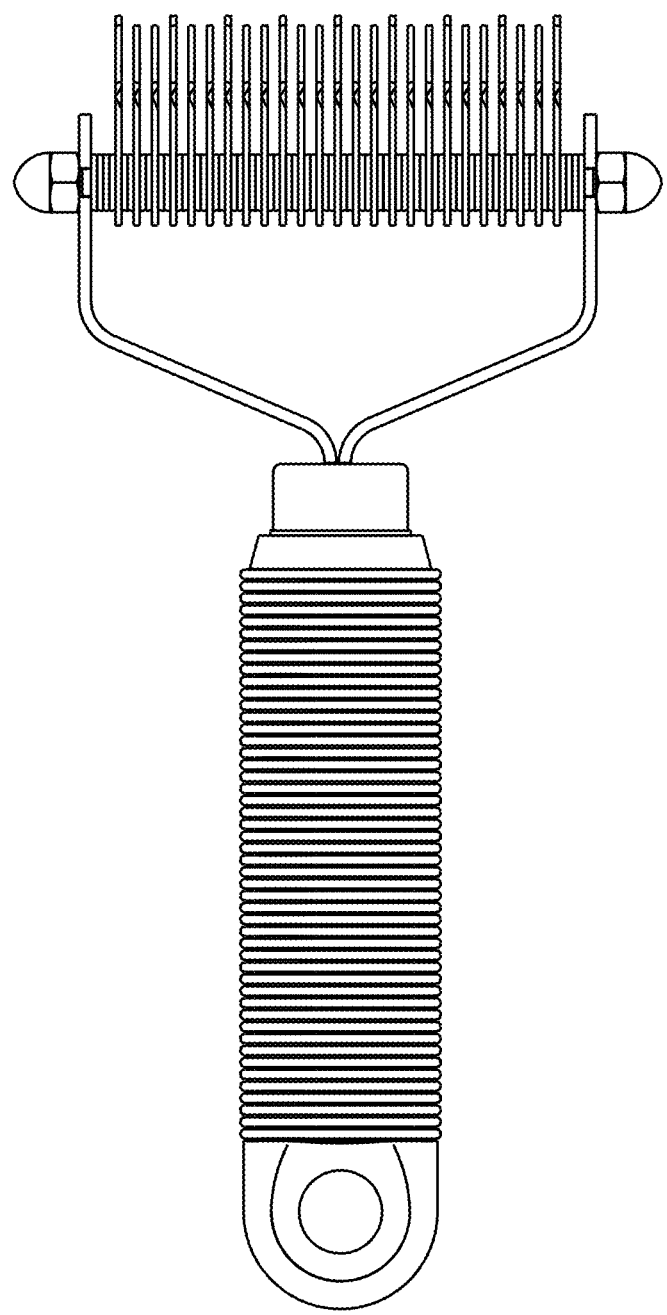
FIG. 5 is a front elevation view of FIG. 1 thereof.
Figure 6:
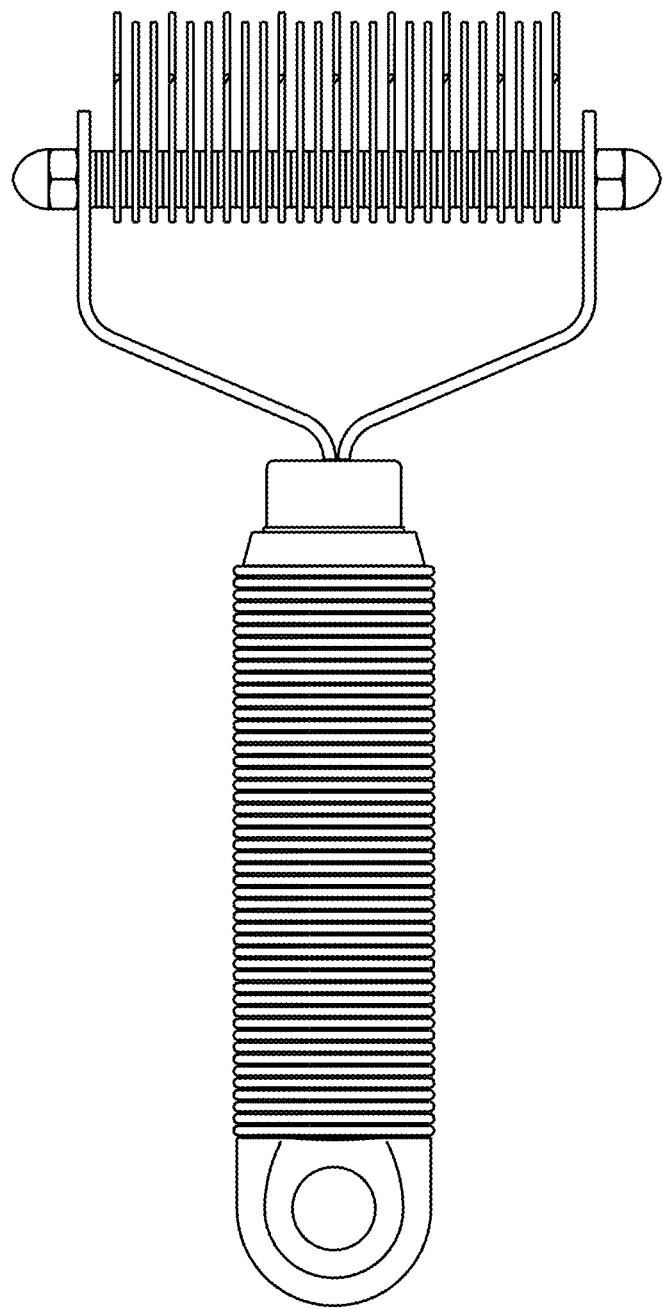
FIG. 6 is a rear elevation view of FIG. 1 thereof.
Figure 7:
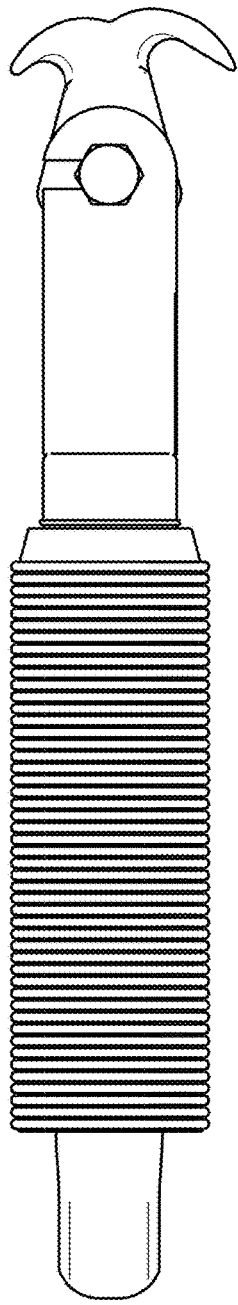
FIG. 7 is a first side elevation view of FIG. 1 thereof.
Figure 8:
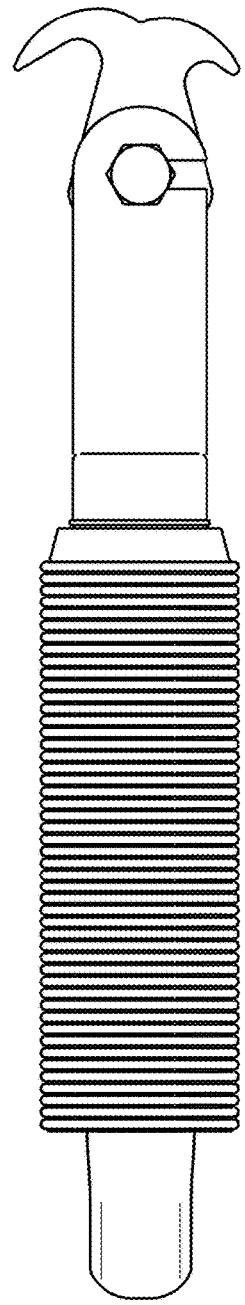
FIG. 8 is a second side elevation view of FIG. 1 thereof.
Figure 9:
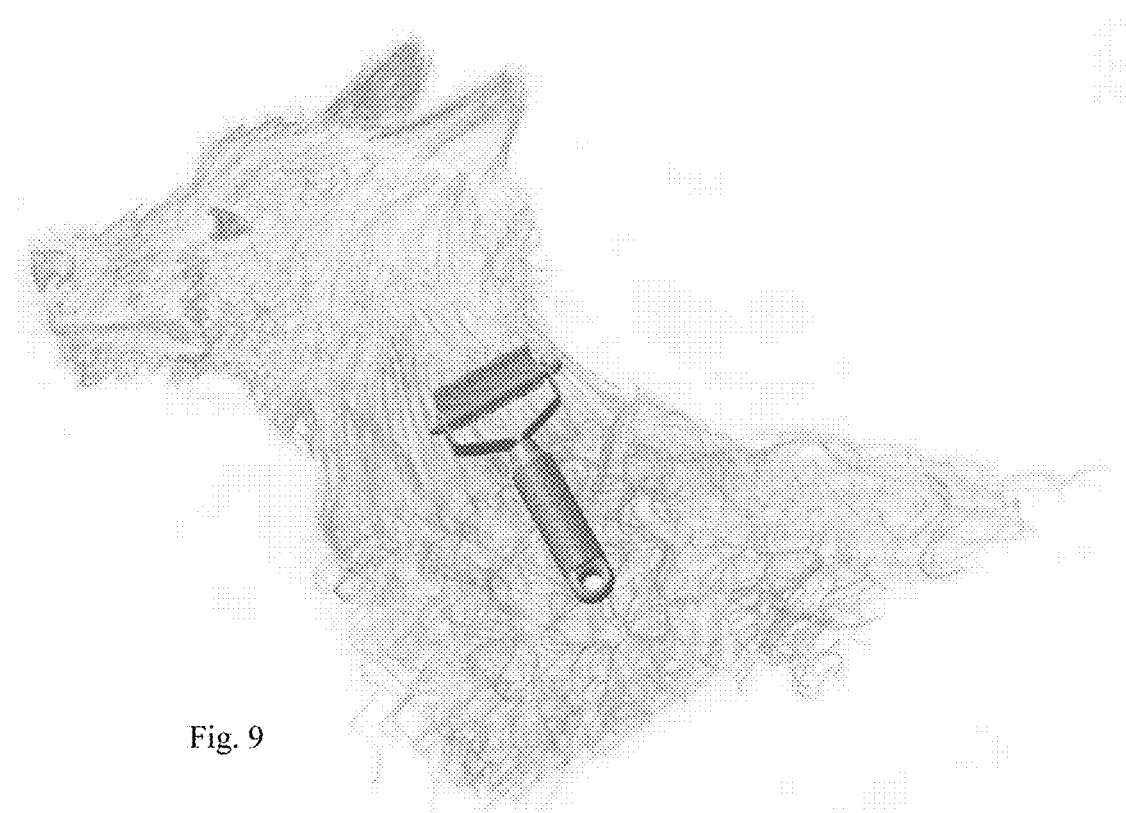
FIG. 9 is a perspective view of FIG. 1, showing the pet grooming tool in use on a long-haired animal.
Figure 10:
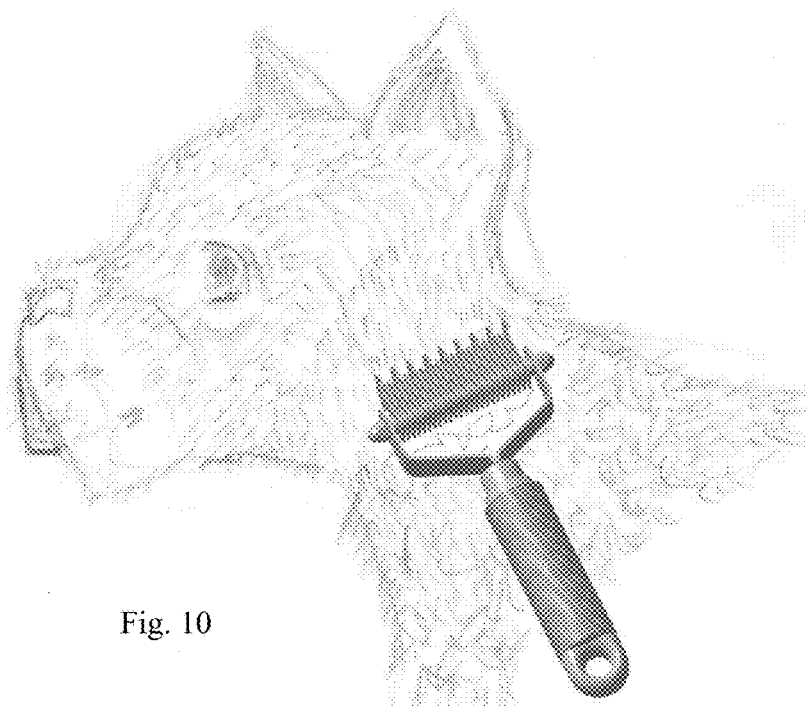
FIG. 10 is a perspective view of FIG. 1, showing the pet grooming tool in use on a short-haired animal.
Figure 11:
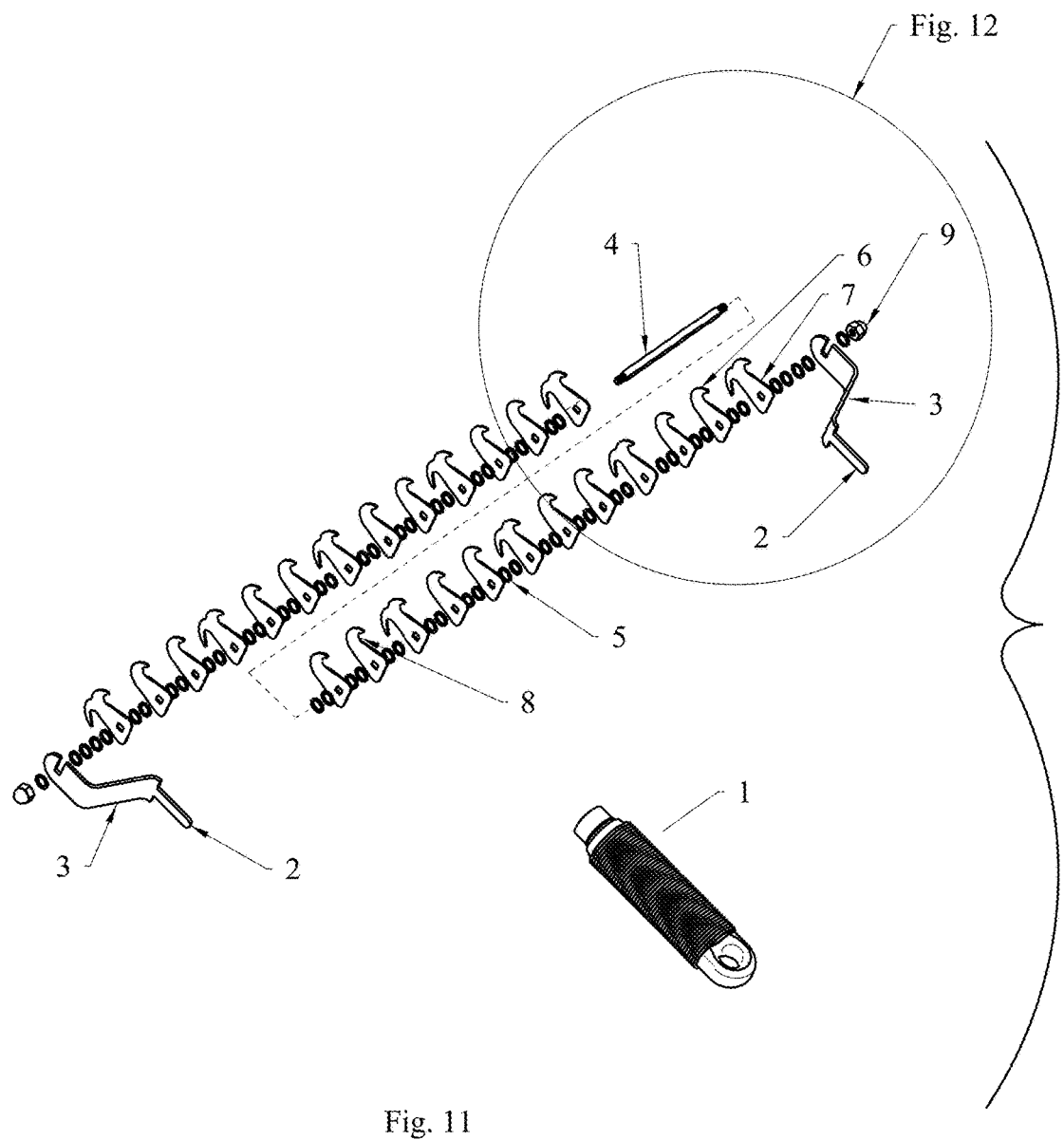
FIG. 11 is a disassembled view of FIG. 1 thereof.
Figure 12:
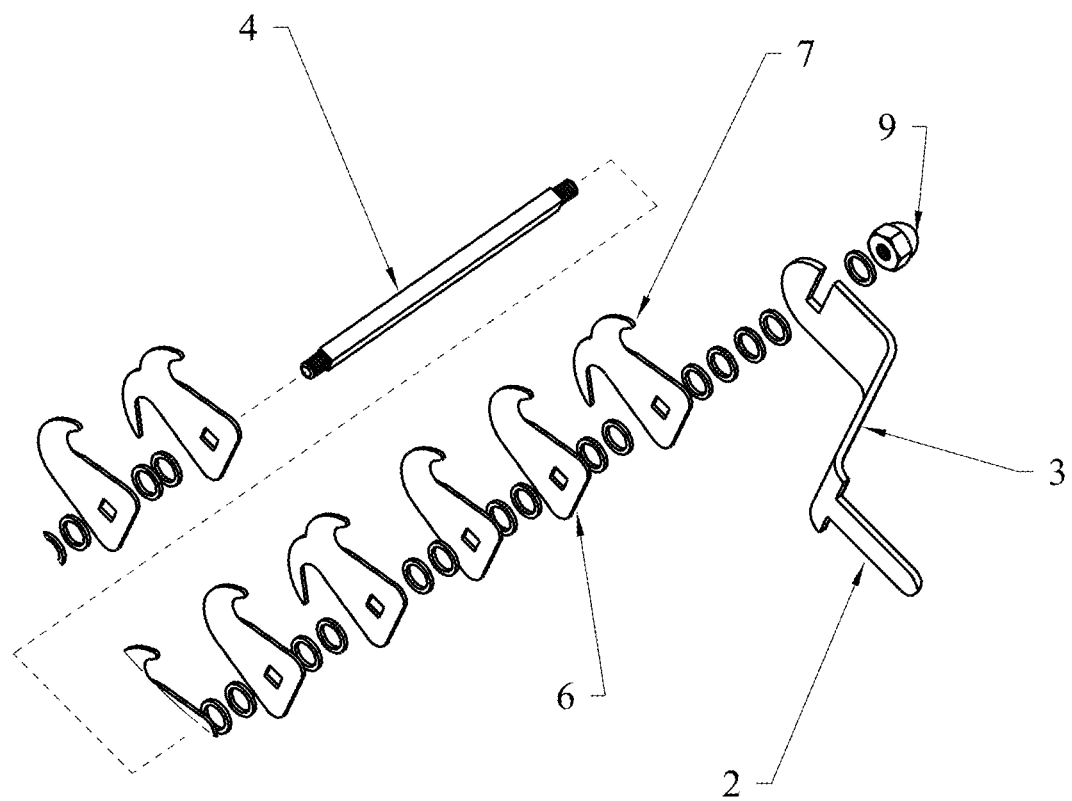
FIG. 12 is an exploded view of a section of the grooming tool shown in FIG. 11 thereof.
Figure 13:
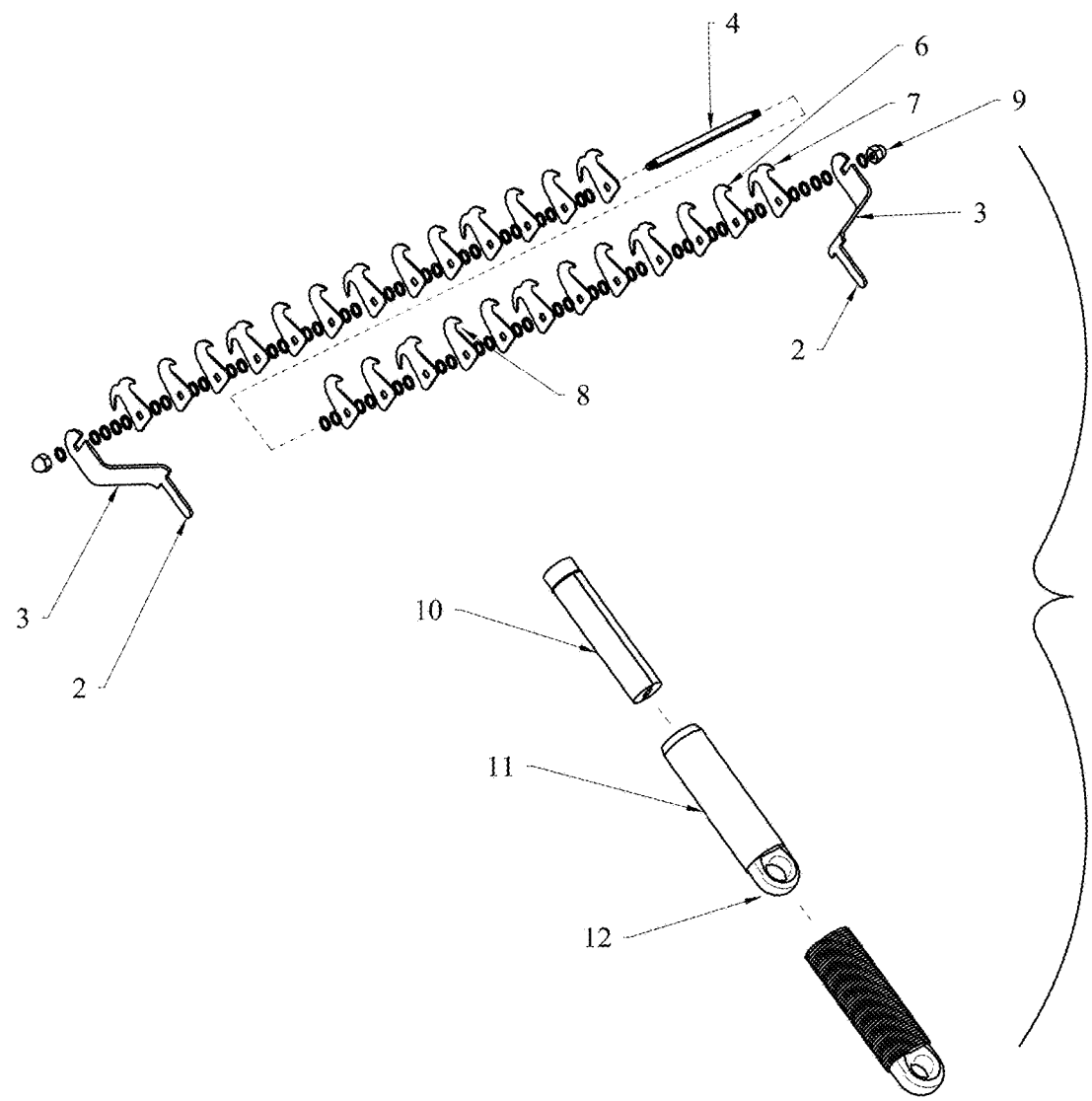
FIG. 13 is another disassembled view of FIG. 1 thereof, showing an embodiment where the handle is formed from three sections.

The animals depicted in FIGS. 9 and 10 are for illustrative purposes only, and do not form part of the claimed invention.

DETAILED DESCRIPTION OF THE INVENTION

The present invention, preferred embodiments of the invention, and the accompanying drawing figures as described herein should not be construed as limited to the illustrated drawing. Rather the illustrated embodiment(s) are detailed to provide a thorough disclosure suitable to convey the scope of the invention to those skilled in the art. For the sake of simplicity, the conjunctive "and" may also be taken to include the disjunctive "or," and vice versa, whenever necessary to give the claims of this patent application the broadest interpretation and construction possible. Likewise, when the plural form is used, it may be taken to include the singular form, and vice versa.

One embodiment of the invention shown in FIGS. 1-13 is a pet grooming tool for deshedding and grooming different animal undercoat, fur, or hair for each animal having different lengths and thicknesses. Here, the pet grooming tool comprises (includes or has):

a. a handle 1 having a proximal portion defining a top hole;

b. a support member having a base member 2 and two upstanding opposing arms 3, with each arm 3 defining a slot, with the base member 2 extending upwardly from the handle 1 top hole; and c. a grooming mechanism comprising a rod 4 removably positioned within the two arm 3 slots, at least two fasteners 9 for fastening each end of the rod 4 within the arm 3 slots, a plurality of spacers 5, a plurality of single-sided combs 6 with each comb 6 having a hook member having a cutting edge 8, and a plurality of double-sided combs 7 with each double-sided comb 7 having two opposing hook members with each hook member having a cutting edge 8, with a first of the hook members of the double-sided combs 7 having height taller than a second of the hook members of the double-sided combs 7;

d. wherein the plurality of single-sided combs 6, the plurality of double-sided combs 7, and the plurality of spacers 5 being arranged in a configuration of one end of the rod 4 supporting at least four spacers (FIGS. 1-3, 5-6, 9-13) abutting a double-sided comb abutting two spacers abutting a single-sided comb abutting two spacers abutting a single-sided comb abutting two spacers abutting a double-sided comb abutting two spacers abutting a single-sided comb abutting two spacers abutting a single-sided comb abutting two spacers abutting a double-sided comb abutting two spacers abutting a single-sided comb abutting two spacers abutting a single-sided comb abutting two spacers abutting a double-sided comb abutting two spacers abutting a single-sided comb abutting two spacers abutting a single-sided comb abutting two spacers abutting a double-sided comb abutting two spacers abutting a single-sided comb abutting two spacers abutting a single-sided comb abutting two spacers abutting a double-sided comb abutting two spacers abutting a single-sided comb abutting two spacers abutting a single-sided comb abutting a double-sided comb abutting two spacers abutting a single-sided comb abutting two spacers abutting a single-sided comb abutting a double-sided comb abutting four spacers at the opposite end the rod 4, with at least one fastener 9 securing the position of each end of the rod 4 within each arm 3 slot; and e. wherein the grooming mechanism for grooming fine animal hair with the single-sided comb and for grooming the undercoat and thick, long animal hair with the double-sided comb, with the first set and second set of the at least four spacers 5 at each rod 4 end preventing shed fur from binding the comb, with shed fur directed away from comb laterally toward the two sets of four spacers 5 for discarding.

The handle 1 has at least an outer layer 12 made preferably from a silicone rubber, silica gel, other rubber materials, or other durable foam materials. Silicone rubber is the preferred material for the handle cushion for user comfort, and also acts as a no-slip handle. Other materials forming the outer layer of the handle are contemplated. In the embodiment shown in FIG. 13, the handle has three layers—an inner layer 10, a middle layer 11, and an outer layer 12. The inner layer 10 of the handle 1 is a strut member. The middle layer 11 of the handle 1 is a binding layer. The outer layer 12 of the handle 1 is a cover member. The strut member is preferably an elongated, tubular, rigid structure having a length shorter than at least the cover member. The strut member may be made from wood. The middle layer 11 of the handle is insertable over the inner layer. A stiffener or adhesive material is applied between the gaps of the inner layer and the middle layer of the handle to adhere the two layers together. The outer layer 12 of the handle is fabricated from molded rubber, foam, or plastic, and is secured around the middle layer with an adhesive. The upper, proximal portion of the handle, particularly at least the top of the inner layer of the handle, defines a hole therethrough for mounting the support member thereto. Alternatively, the upper portion of the handle, particularly the inner layer, may be integral with the bottom of the support member.

A lower, distal portion of the handle 1 defines a bore therethrough for hooking the handle 1 onto another structure such as a belt-loop or a storage ring. The bore may further include a grommet for additional strength when the handle is hung during non-use. The bore is defined at least through the outer layer of the handle 1. When assembled, at least the outer layer of the handle has a semi-soft gripped cushion. The handle supports the support member. The strut member of the handle provides strength and stability to the apparatus during the grooming operation. The texture of the outer layer of the handle may be smooth, or it may have a plurality of vertical or horizontal grooves arranged along the length of the handle. The outer layer of the handle may further have contouring to fit the user's hand.

The support member preferably has two base members 2, two upstanding arms 3, and a grooming mechanism. The two base members of the support member are either formed from the handle (not shown) or are rotatably attachable through the hole at the top of the handle. Each base member 2 abuts the other base member until both base members are secured to the handle 1. From each base member 2 extends one of the upstanding arms 3, with each base member 2 and arm 3 being a mirror image of the other base member 2 and other arm 3. The distal portion of each arm 3 closest to the respective base member 2 extends or overhangs over the base member 2. A lower section of the arm 3 extends upwardly a distance A to an elbow joint, then contours outwardly to a middle section of the arm 3 at an obtuse angle away from the base member 2 a distance B to another elbow joint, then the arm 3 extends upwardly to an upper section to a distance C to terminate at an end. The middle section of the arm 3 allows further stabilization and strength to the apparatus during grooming activities. The upper, proximal portion of the arm 3 has a length shorter than the middle section of the arm 3. The upper portion of each arm 3 also defines a slot on a lateral side of the arm 3. Each end of the arm is contoured, rounded, or otherwise tapered. The contoured end of the arm decreases injury, and in most cases prevents injury, to the animal during grooming activities. When assembled, each arm mirrors the other arm. The support member is held in place and is immovable once secured to the handle 1. In another embodiment (not shown), the base member 2 and the arms are a single unit.

The grooming member has a longitudinal rod 4, a plurality of spacers 5, a plurality of single-sided combs 6, a plurality of double-sided combs 7 with each of the combs 6, 7 having cutting edge, and at least two fasteners 9. Each of the plurality of single-sided 6 and the plurality of double-sided combs 7, along with the plurality of spacers 5, are arranged in a configuration for maximum grooming for use with various animals having different fur lengths and thicknesses.

The rod 4 preferably has a length longer than the length of each arm middle section. In the embodiment as shown in the FIGS. 11-13, the rod 4 is a tubular structure having opposing threaded ends, with each of the ends for receiving a fastener 9. The threaded ends of the rod 4 have a smaller diameter when compared to the remaining diameter of the rod 4. As depicted in the figures, the fasteners 9 are preferably a washer and a nut. After the plurality of the combs 6, 7 and spacers 5 are assembled on the rod 4, the washer is slidably inserted over each end of the rod 4 to abut the outer side of an arm. The nut is threadably attached over the rod 4. The fasteners 9 act as a cap for the rod 4 to keep the rod 4 from inadvertently dislodging from the arm slots.

Each of the plurality of spacers 5 is preferably a circular ring with a hole centrally defined therethrough for slidably inserting over the rod 4 and for abutting against the combs. At least two spacers 5 are installed between each comb. At least four spacers 5 are installed between the inside of the arm and the exterior of the outermost comb on each side of the apparatus. The spacing arrangement of the apparatus spacers benefit the groomer and the animal for ease in detangling and dematting the animal's hair.

Each of the plurality of single-sided combs 6 has a body defining an aperture for slidably inserting the comb 6, 7 over the rod 4, and with the body having a single hook member with a rounded tip and a single cutting edge 8. The hook member curves in a "C" shape upwardly from the body of the comb. The cutting edge 8 is essentially a stainless-steel blade extending the length of the "C shape" of the comb 6, 7 a distance X. However, the cutting edge does not extend to the end of the hook member. The position of the cutting edge 8 avoids scratching or harming the animal during the grooming process. One side of the cutting edge 8 tapers inwardly while the opposite side of the cutting edge 8 is a substantially flat, blunt side. The aperture of the comb body is preferably a square shape. The curve of the hook member has a radius R which is larger than the radius of the rod 4.

Each of the plurality of double-sided combs 7 has a body defining an aperture for slidably inserting the comb over the rod. The double-sided comb 7 has a body, with the body having a first hook member with a rounded tip, a second hook member with a rounded tip. Each of the hook members has a cutting edge 8. One of the hook members (a first hook member) is taller and shallower than the second hook member. Except for being a taller and shallower hook member, the first hook member of the double-sided comb 7 with its cutting edge 8 resembles the single hook member of the single-sided comb 6 and its cutting edge 8.

The top surface of each hook member of the single-sided comb and double-sided comb is contoured and substantially smooth. The opening or aperture of each of the plurality of combs is preferably a square shape, although other shapes are contemplated. The base of each hook member of the combs is configured in a substantially rhombus shape, although other shapes are contemplated. As the base extends upwardly to form the hook member, the neck of the base tapers inwardly on each side of the base.

The grooming mechanism is arranged in the following configuration as depicted in Table 1: double-sided comb, two spacers, single-sided comb, two spacers, single-sided comb, two spacers, then repeated for nine times for a total of nine double-sided combs and sixteen single-sided combs. At each end of the rod between the inner face of the arm and the outer face of the double-sided comb are four spacers, with the spacer farthest from each end of the rod abutting a double-sided comb, for a total of eight spacers as acting as end caps nearest the arms of the apparatus. The four end spacers prevent the shed hair or fur from collecting between the combs and the arms, and aid in more detailed grooming of the animal. The four end spacers further sandwich the sets of combs and further tightens them on the rod between the arms. The selection and arrangement of the two spacers between each of the combs, along with the arrangement of two spaced single-sided combs between two double-sided combs were chosen after testing existing grooming tools to overcome those tools deficiencies in grooming both long hair, short hair, and undercoat of animals. Using only a single spacer, or omitting a spacer between the combs, or having a double-sided comb to single-sided comb to double-sided comb may result in the combs being too close together to effectively de-shed, detangle, and groom the animal.

TABLE 1

4 SP | 1 DSC | 2 SP | 1 SSC | 2 SP | 1 SSC | 2 SP | 1 DSC | 2 SP | 1 SSC | 2 SP | 1 SSC | 2 SP | 1 DSC | 2 SP | 1 SSC | 2 SP | 1 SSC | 2 SP | 1 DSC | 2 SP | 1 SSC | 2 SP | 1 SSC | 2 SP | 1 DSC | 2 SP | 1 SSC | 2 SP | 1 SSC | 2 SP | 1 DSC | 2 SP | 1 SSC | 2 SP | 1 SSC | 2 SP | 1 DSC | 2 SP | 1 SSC | 2 SP | 1 SSC | 2 SP | 1 DSC | 4 SP

2 SP - 2 abutting spacers. DSC - double-sided comb, SSC - single-sided comb, 4 SP - 4 abutting spacers. "|" - refers to abutting The method of assembling and using the handle includes the steps of adhering the inner layer, middle layer, and outer layer of the handle together with an adhesive; inserting and fastening the distal end of the support member's base member into the handle's top hole; assembling the comb arrangement on the rod before inserting the ends of the rod through the two respective arm slots and fastening the rod with two fasteners; and selecting a first side of the apparatus without the single-sided combs to groom the animal with long hair, and selecting a second side of the apparatus with the single-sided combs to groom the animal to remove long or short hair.

In another embodiment, the invention is a pet grooming tool comprising (including or having):
  (a) a handle having a distal portion and a proximal portion with the proximal portion defining a top hole, with the handle comprising an inner rigid layer being adhered to a middle layer being adhered to an outer layer having a cushion, and with the distal portion of the handle defining an opening for hanging or suspending the apparatus;
  (b) a support member having a first base member, a second base member, a first arm defining a slot, and a second arm defining a slot, with the first arm extending from the first base member, with the second arm extending from the second base member, and with the two base members removably abutting each other during insertion into the handle top hole;
  (c) a grooming mechanism comprising a rod insertable through the two arm slots, at least two fasteners for fastening each end of the rod onto each of the arm slots, a plurality of spacers, a plurality of single-sided combs each comb having a hook member having a cutting edge, and a plurality of double-sided combs each comb having a first hook member and a second hook member with each of the hook members having a cutting edge, and with the first of the double-sided comb hook members each having height taller than the second of the double-sided hook members;
  (d) wherein the plurality of single-sided combs, the plurality of double-sided combs, and the plurality of spacers being arranged with from one end of the rod as four spacers abutting a double-sided comb abutting two spacers abutting a single-sided comb abutting two spacers abutting a single-sided comb abutting two spacers abutting a double-sided comb abutting two spacers abutting a single-sided comb abutting two spacers abutting a single-sided comb abutting two spacers abutting a double-sided comb abutting two spacers abutting a single-sided comb abutting two spacers abutting a single-sided comb abutting two spacers abutting a double-sided comb abutting two spacers abutting a single-sided comb abutting two spacers abutting a single-sided comb abutting two spacers abutting a double-sided comb abutting two spacers abutting a single-sided comb abutting two spacers abutting a single-sided comb abutting two spacers abutting a double-sided comb abutting two spacers abutting a single-sided comb abutting two spacers abutting a single-sided comb abutting two spacers abutting a double-sided comb abutting two spacers abutting a single-sided comb abutting two spacers abutting a single-sided comb abutting a double-sided comb abutting two spacers abutting a single-sided comb abutting two spacers abutting a single-sided comb abutting a double-sided comb abutting four spacers at the opposite end of the rod for grooming fine, short animal hair and for grooming the undercoat and thick long animal hair using a single apparatus.

In another embodiment, the invention is a pet grooming tool comprising:
  (a) a handle having a proximal portion defining a top hole;
  (b) a support member having a base member and two opposing arms, with each arm defining a slot, with the base member extending from the handle top hole; and
  (c) a grooming mechanism comprising a rod removably insertable through the two arm slots, at least two fasteners for fastening each end of the rod onto the apparatus, a plurality of spacers, a plurality of single-sided combs each comb having a cutting edge, and a plurality of double-sided combs each comb having a hook member having a cutting edge at each side of the comb, with a first of the hook members of the double-sided combs having height taller than a second of the hook members of the double-sided combs;
  (d) wherein the plurality of single-sided combs, the plurality of double-sided combs, and the plurality of spacers being arranged with from one end of the rod as four spacers abutting a double-sided comb abutting two spacers abutting a single-sided comb abutting two spacers abutting a single-sided comb abutting two spacers abutting a double-sided comb abutting two spacers abutting a single-sided comb abutting two spacers abutting a single-sided comb abutting two spacers abutting a double-sided comb abutting two spacers abutting a single-sided comb abutting two spacers abutting a single-sided comb abutting two spacers abutting a double-sided comb abutting two spacers abutting a single-sided comb abutting two spacers abutting a single-sided comb abutting two spacers abutting a double-sided comb abutting two spacers abutting a single-sided comb abutting two spacers abutting a single-sided comb abutting two spacers abutting a double-sided comb abutting two spacers abutting a single-sided comb abutting two spacers abutting a single-sided comb abutting two spacers abutting a double-sided comb abutting two spacers abutting a single-sided comb abutting two spacers abutting a single-sided comb abutting a double-sided comb abutting two spacers abutting a single-sided comb abutting two spacers abutting a single-sided comb abutting a double-sided comb abutting four spacers at the opposite end of the rod for grooming fine, short animal hair and for grooming the undercoat and thick long animal hair using a single apparatus.

I claim:

1. A pet grooming tool for deshedding and grooming different animal undercoat, fur, or hair having different lengths and thicknesses, the pet grooming tool comprising:
   a. a handle having a proximal portion defining a top hole;
   b. a support member having a base member and two upstanding opposing arms, with each arm defining a slot, with the base member extending upwardly from the handle top hole; and
   c. a grooming mechanism comprising a rod removably positioned within the two arm slots, at least two fasteners for fastening each end of the rod within the arm slots, a plurality of spacers, a plurality of single-sided combs with each comb having a hook member having a cutting edge, and a plurality of double-sided combs with each double-sided comb having two opposing hook members with each hook member having a cutting edge, with a first of the hook members of the double-sided combs having height taller than a second of the hook members of the double-sided combs;
   d. wherein the plurality of single-sided combs, the plurality of double-sided combs, and the plurality of spacers being arranged with from one end of the rod as four spacers abutting a double-sided comb abutting two spacers abutting a single-sided comb abutting two spacers abutting a single-sided comb abutting two spacers abutting a double-sided comb abutting two spacers abutting a single-sided comb abutting two spacers abutting a single-sided comb abutting two spacers abutting a double-sided comb abutting two spacers abutting a single-sided comb abutting two spacers abutting a single-sided comb abutting two spacers abutting a double-sided comb abutting two spacers abutting a single-sided comb abutting two spacers abutting a single-sided comb abutting two spacers abutting a double-sided comb abutting two spacers abutting a single-sided comb abutting two spacers abutting a single-sided comb abutting two spacers abutting a double-sided comb abutting two spacers abutting a single-sided comb abutting a double-sided comb abutting two spacers abutting a single-sided comb abutting two spacers abutting a single-sided comb abutting two spacers abutting a single-sided comb abutting a double-sided comb abutting four spacers at the opposite end of the rod, with at least one fastener securing the position of each end of the rod within each arm slot;
   e. wherein the grooming mechanism for grooming fine, short animal hair or to fur with the single-sided comb and for grooming the undercoat and thick, long animal hair with the double-sided comb, with the first set and second set of the at least four spacers at each rod end preventing shed fur from binding the comb, with shed fur directed away from comb laterally toward the two sets of four spacers for discarding.

2. The pet grooming tool of claim 1, the handle further comprising an inner rigid layer of the handle, an outer layer of the handle, and a distal portion of the handle defining a bore through at least the outer layer of the handle.

3. The pet grooming tool of claim 2, the handle further comprising a middle layer of the handle, with the inner rigid layer of the handle adhered to the middle layer of the handle, with the middle layer of the handle adhered to the outer layer of the handle.

4. The pet grooming tool of claim 1, the outer layer of the handle comprising at least a cushioned handgrip.

5. The pet grooming tool of claim 1, the rod of the grooming mechanism having a length longer than the middle section of the arms, with each end of the rod further comprising opposing threaded ends, with each of the ends of the rod for receiving a fastener.

6. The pet grooming tool of claim 1, each of the plurality of single-sided combs and each of the plurality of double-sided combs further comprising a body defining an aperture for slidably inserting each comb over the rod, with a neck of the base tapering inwardly on each side of the base, and the hook member extending from the body.

7. The pet grooming tool of claim 6, the hook member of each of the plurality of single-sided combs and the plurality of double-sided combs each having a rounded tip, with the cutting edge of each hook member extending the length of a "C shape" of the comb a distance X without extending to the tip of the hook member to prevent scratching or harming the animal during the grooming process, and with one side of the cutting edge tapering inwardly while the opposite side of the cutting edge remains a substantially flat, blunt edge.

8. A pet grooming tool for deshedding and grooming different animal undercoat, fur, or hair having different lengths and thicknesses, the pet grooming tool comprising:
   a. a handle comprising an inner rigid layer of the handle, an outer layer of the handle, a distal portion of the handle defining a bore through at least the outer layer of the handle, and a proximal portion of the handle defining a top hole;
   b. a support member comprising two base members with each base member having an upstanding arm, with each arm defining a slot, and with the two base members abutting each other and being upwardly extendable from the handle top hole; and
   c. a grooming mechanism comprising a rod removably positioned within the two arm slots, at least two fasteners for fastening each end of the rod within each of the arm slots, a plurality of spacers, a plurality of single-sided combs with each comb having a hook member having a cutting edge, and a plurality of double-sided combs with each side of the comb having two opposing hook members with each hook member having a cutting edge, with a first of each of the hook members of the double-sided combs having height taller than a second of each of the hook members of the double-sided combs;

d. wherein the plurality of single-sided combs, the plurality of double-sided combs, and the plurality of spacers being arranged with from one end of the rod as four spacers abutting a double-sided comb abutting two spacers abutting a single-sided comb abutting two spacers abutting a single-sided comb abutting two spacers abutting a double-sided comb abutting two spacers abutting a single-sided comb abutting two spacers abutting a single-sided comb abutting two spacers abutting a double-sided comb abutting two spacers abutting a single-sided comb abutting two spacers abutting a single-sided comb abutting two spacers abutting a double-sided comb abutting two spacers abutting a single-sided comb abutting two spacers abutting a single-sided comb abutting two spacers abutting a double-sided comb abutting two spacers abutting a single-sided comb abutting two spacers abutting a single-sided comb abutting two spacers abutting a double-sided comb abutting two spacers abutting a single-sided comb abutting two spacers abutting a single-sided comb abutting two spacers abutting a double-sided comb abutting two spacers abutting a single-sided comb abutting two spacers abutting a single-sided comb abutting a double-sided comb abutting two spacers abutting a single-sided comb abutting two spacers abutting a single-sided comb abutting a double-sided comb abutting four spacers at the opposite end of the rod, with at least one fastener securing the position of each end of the rod within each arm slot;

e. wherein the grooming mechanism for grooming fine, short animal hair with the single-sided comb and for grooming the undercoat and thick, long animal hair with the double-sided comb, with the first set and second set of the at least four spacers at each rod end preventing shed fur from binding the comb, with shed fur directed away from comb laterally toward the two sets of four spacers for discarding.

9. The pet grooming tool of claim 8, the handle further comprising a middle layer, with the inner rigid layer of the handle adhered to the middle layer of the handle with a first adhesive material, with the middle layer of the handle adhered to the outer layer of the handle with a second adhesive material, and with the outer layer of the handle having at least a cushioned handgrip.

10. The pet grooming tool of claim 8, the rod of the grooming mechanism having a length longer than the middle section of the arms, with each end of the rod further comprising opposing threaded ends, with each of the ends of the rod for receiving a fastener.

11. The pet grooming tool of claim 8, each of the plurality of single-sided combs and each of the plurality of double-sided combs further comprising a body defining an aperture for slidably inserting each comb over the rod, with a neck of the base tapering inwardly on each side of the base, and the hook member extending from the body.

12. The pet grooming tool of claim 11, the hook member of each of the plurality of single-sided combs and the plurality of double-sided combs each having a rounded tip, with the cutting edge of each hook member extending the length of a "C shape" of the comb a distance X without extending to the tip of the hook member to prevent scratching or harming the animal during the grooming process, and with one side of the cutting edge tapering inwardly while the opposite side of the cutting edge remains a substantially flat, blunt edge.

13. A pet grooming tool for deshedding and grooming different animal undercoat, fur, or hair having different lengths and thicknesses, the pet grooming tool comprising:

a. a handle comprising a distal portion and a proximal portion, with the proximal portion defining a top hole and the distal portion of the handle defining a bore for hanging or suspending the apparatus, with the handle further comprising an inner rigid layer, a middle layer, and outer layer, with the inner rigid layer of the handle adhered to the middle layer with a first adhesive material, with the middle layer of the handle adhered to the outer layer of the handle with a second adhesive material, and with the outer layer of the handle having at least a cushioned handgrip;

b. a support member having a first base member, a second base member, a first arm, and a second arm, with the first arm defining a slot and the first arm extending from the first base member, with the second arm defining a slot and the second arm extending from the second base member, and with the two base members removably abutting each other during rotatable insertion into the handle top hole;

c. a grooming mechanism comprising a rod removably positioned within the two arm slots, at least two fasteners for fastening each end of the rod within each of the arm slots, a plurality of spacers, a plurality of single-sided combs each comb having a hook member having a cutting edge, and a plurality of double-sided combs each comb having a first hook member and a second hook member with each of the hook members having a cutting edge, and with a first hook member of the double-sided comb having height taller than the second hook member of the double-sided comb;

d. wherein the plurality of single-sided combs, the plurality of double-sided combs, and the plurality of spacers being arranged with from one end of the rod as four spacers abutting a double-sided comb abutting two spacers abutting a single-sided comb abutting two spacers abutting a single-sided comb abutting two spacers abutting a double-sided comb abutting two spacers abutting a single-sided comb abutting two spacers abutting a single-sided comb abutting two spacers abutting a double-sided comb abutting two spacers abutting a single-sided comb abutting two spacers abutting a single-sided comb abutting two spacers abutting a double-sided comb abutting two spacers abutting a single-sided comb abutting two spacers abutting a single-sided comb abutting two spacers abutting a double-sided comb abutting two spacers abutting a single-sided comb abutting two spacers abutting a single-sided comb abutting two spacers abutting a double-sided comb abutting two spacers abutting a single-sided comb abutting two spacers abutting a single-sided comb abutting two spacers abutting a double-sided comb abutting two spacers abutting a single-sided comb abutting two spacers abutting a single-sided comb abutting a double-sided comb abutting two spacers abutting a single-sided comb abutting two spacers abutting a single-sided comb abutting a double-sided comb abutting four spacers at the opposite end of the rod, with at least one fastener securing the position of each end of the rod within each arm slot;

e. wherein the grooming mechanism for grooming fine, short animal hair with the single-sided comb and for grooming the undercoat and thick, long animal hair with the double-sided comb, with the first set and second set of the at least four spacers at each rod end preventing shed fur from binding the comb, with shed fur directed away from comb laterally toward the two sets of four spacers for discarding.

14. The pet grooming tool of claim 13, the inner rigid layer of the handle comprising a strut member having a length shorter than the outer layer of the handle.

15. The pet grooming tool of claim 13, each of the two arms of the support member further comprising a lower section having distal portion extending upwardly and overhanging from the base member a distance A to a joint, then contouring as a middle section outwardly at an obtuse angle away from the base member a distance B to another joint, then an upper section extending upwardly a distance C to terminate at a proximal portion; wherein the upper section of the arm having a length shorter than the middle section of the arm.

16. The pet grooming tool of claim 13, the rod of the grooming mechanism having a length longer than the middle section of the arms, with each end of the rod further comprising opposing threaded ends, with each of the ends of the rod for receiving a fastener.

17. The pet grooming tool of claim 13, each of the plurality of single-sided combs and each of the plurality of double-sided combs further comprising a body defining an aperture for slidably inserting each comb over the rod, with a neck of the base tapering inwardly on each side of the base, and the hook member extending from the body.

18. The pet grooming tool of claim 17, the hook member of each of the plurality of single-sided combs and the plurality of double-sided combs each having a rounded tip, with the cutting edge of each hook member extending the length of a "C shape" of the comb a distance X without extending to the tip of the hook member to prevent scratching or harming the animal during the grooming process, and with one side of the cutting edge tapering inwardly while the opposite side of the cutting edge remains a substantially flat, blunt edge.

* * * * *